United States Patent [19]
Yamauchi et al.

[11] Patent Number: 5,336,844
[45] Date of Patent: Aug. 9, 1994

[54] INFORMATION STORAGE MEDIUM AND APPARATUS FOR REPRODUCING INFORMATION THEREFROM

[75] Inventors: Keiichi Yamauchi; Toshihiko Shimizu; Satomi Sudo, all of Kawagoe, Japan

[73] Assignee: Pioneer Electronic Corporation, Tokyo, Japan

[21] Appl. No.: 725,092

[22] Filed: Jul. 2, 1991

[30] Foreign Application Priority Data

Jul. 6, 1990 [JP] Japan .................. 2-179794

[51] Int. Cl.$^5$ .................. G09B 15/04; G10H 7/00
[52] U.S. Cl. .................. 84/602; 84/609; 84/610; 84/477 R; 348/484; 358/341
[58] Field of Search .................. 84/601, 602, 605, 609, 84/610, 615, 649, 650, 653, 678, 712, 477 R, 478; 364/419; 358/143, 341, 335, 342, 343; 395/144, 147, 152, 153, 164, 165, 166, 275; 365/230.03; 369/47–49; 348/484, 485

[56] References Cited

U.S. PATENT DOCUMENTS

| | | | |
|---|---|---|---|
| 4,419,920 | 12/1983 | Ohe | 358/143 |
| 4,914,527 | 4/1990 | Asai et al. | 358/343 |
| 4,992,886 | 2/1991 | Klappert | |
| 5,046,004 | 9/1991 | Tsumura et al. | 84/601 |
| 5,097,349 | 3/1992 | Nomura et al. | 358/335 |
| 5,107,343 | 4/1992 | Kawai | 358/335 |
| 5,131,311 | 7/1992 | Murakami et al. | 84/609 |

FOREIGN PATENT DOCUMENTS

0372678 6/1989 European Pat. Off. .

OTHER PUBLICATIONS

Ex parte S (Board of Appeals) Aug. 4, 1943 (Case No. 109), 25 *Journal of the Patent Office Society* 904.
CDROMXA, Apr. 1991, "Electronics" pp. 48–53.
Patent Abstracts of Japan, JP-A-1 205 781, vol. 13, No. 508 (P-960) Nov. 15, 1989.

*Primary Examiner*—Stanley J. Witkowski
*Assistant Examiner*—H. Kim
*Attorney, Agent, or Firm*—Sughrue, Mion, Zinn, Macpeak & Seas

[57] ABSTRACT

An information storage medium such as a CD-ROM has a storage area divided into a plurality of sections, for storing digital audio information and for storing picture information and character information, which are stored independently of each other. The digital audio information includes accompaniment information which represents musical accompaniments relative to songs, and the character information includes information which represents words of the songs to be reproduced in time with the musical accompaniments, in the form of characters, figures, colors, or a combination thereof. An information reproducing apparatus for playing back the information storage medium controls the speed at which the character information is to be output, the shape of characters and figures representing the character information, the colors thereof, or a combination thereof.

12 Claims, 14 Drawing Sheets

FIG. 5

| | SOUND QUALITY LEVEL | TYPE | SAMPLING FREQUENCY (kHz) | QUANTIZING NUMBER (BIT) | BIT REDUCTION RATIO (STEREO/MONO) | AUDIO CHARACTERISTICS | |
|---|---|---|---|---|---|---|---|
| | | | | | | DYNAMIC RANGE (dB) | FREQUENCY RANGE (kHz) |
| | CD DIGITAL AUDIO (SOUND QUALITY CORRESPONDING TO PRESENT 16-BIT PCM) | PCM | 44.1 | 16 | 1 | 98 | 20 |
| A | HIFI (SOUND QUALITY CORRESPONDING TO LP RECORD) | ADPCM | 37.8 | 8 | 1/2/1/4 | 90 | 17 |
| B | MID-HIFI (SOUND QUALITY CORRESPONDING TO FM BROADCAST) | ADPCM | 37.8 | 4 | 1/4/1/8 | 90 | 17 |
| C | SPEECH (SOUND QUALITY CORRESPONDING TO AM BROADCAST) | ADPCM | 18.9 | 4 | 1/8/1/16 | 50 | 8.5 |

BACKGROUND
OUTER EDGE
CHARACTER

| I | I | I | I | I | I |
|---|---|---|---|---|---|
| I | I | I | III | I | I |
| I | III | III | III | III | I |
| III | III | II | II | III | III |
| II | II | II | II | II | III |
| II | II | II | II | II | II |

|  | ALLOTTED COLOR INFORMATION |
|---|---|
| I | COLOR OF BACKGROUND |
| II | COLOR OF CHARACTER |
| III | COLOR OF OUTER EDGE |
| IV | COLOR OF CHARACTER AS IT CHANGES IN COLOR |

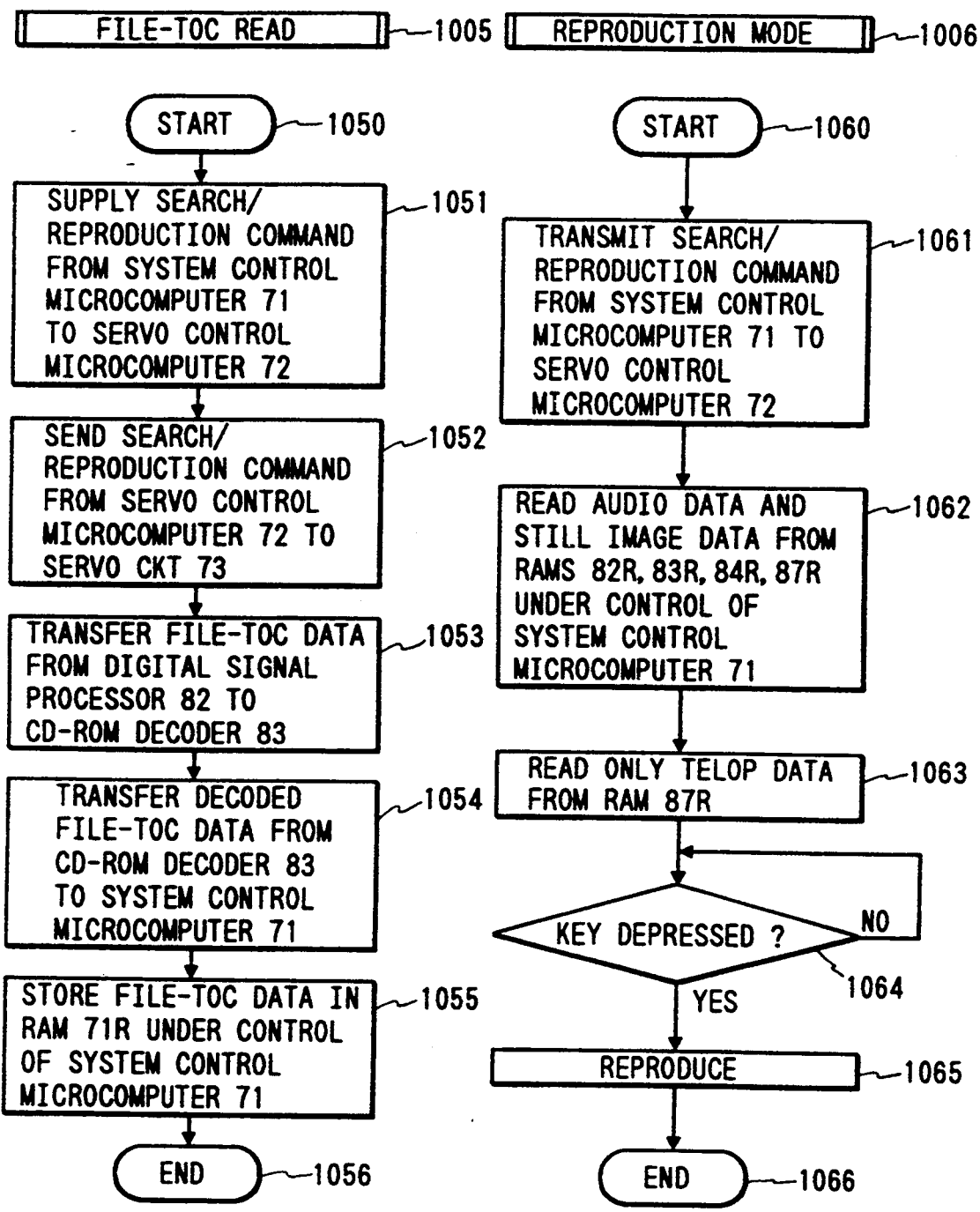

INFORMATION STORAGE MEDIUM AND APPARATUS FOR REPRODUCING INFORMATION THEREFROM

BACKGROUND OF THE INVENTION

The present invention relates to an information storage medium and an apparatus for reproducing information from the information storage medium, and more particularly to an information storage medium suitable for storing digital audio information including musical accompaniments, so-called "karaoke", and image information relative thereto, and an apparatus for reproducing the digital audio information from the information storage medium.

A conventional apparatus for playing back prerecorded musical accompaniments, or a musical accompaniment playback apparatus, reproduces such prerecorded musical accompaniments by playing back information recording mediums, such as magnetic tapes, video disks, etc., on which only musical accompaniments are recorded. Such a musical accompaniment playback apparatus includes an amplifier connected to a microphone and a loudspeaker, and mixes vocal signals supplied from the microphone with signals of reproduced musical accompaniments, amplifies the mixed signals, and supplies the amplified signals to the loudspeaker to produce audible sounds.

There are known audio-visual musical accompaniment playback apparatuses capable of reproducing musical accompaniments stored in video disks (VD) or compact disks (CD) and, while at the same time, displaying images on graphic display units.

When a user of such an audio-visual musical accompaniment playback apparatus sings a desired song to a corresponding musical accompaniment reproduced from an information storage medium, i.e., a VD or a CD, words of the song are displayed on a graphic display unit immediately before the portion of the musical accompaniment which corresponds to those words is reached.

In a VD or a CD, character information which represents words of songs are recorded in superimposed relationship to video information, animation image information, or still image information. Therefore, since the words of songs are displayed in time with the recorded pictures, the display of the words of songs cannot be controlled independently of the pictures.

It would be highly convenient for the user to adjust the speed at which character image is to be displayed on a graphic display unit independently of the pictures, be able to select words of songs from a Japanese version to an English version or display a timing to start to sing songs by switching.

SUMMARY OF THE INVENTION

It is an object of the present invention to provide an information storage medium which can be controlled to display image information relative to words of recorded songs, independently of other image information stored therein, and an information reproducing apparatus for reproducing the information from the information storage medium.

According to one aspect of the present invention, there is provided an information storage medium comprising a storage area divided into a plurality of sections, for storing digital audio information and digital image information, the digital image information containing picture information and character information, the picture information and the character information being stored independently of each other. The digital audio information includes accompaniment information which represents musical accompaniments relative to songs, and the character information includes information which represents words of the songs to be reproduced in time with the musical accompaniments, in the form of characters figures, colors, or a combination thereof. The information storage medium may include an optical storage disk according to Adaptive Differential Pulse Code Modulation system.

According to another aspect of the present invention, an apparatus for reproducing information from the information storage medium includes information reading means for reading information from the information storage medium, information demodulating means for demodulating the information read by the information reading means and outputting the demodulated information, and control means for controlling the information demodulating means to vary the speed at which the character information is to be output from the information demodulating means, the shape of the characters and figures, the colors thereof, or a combination thereof. The apparatus may further comprise information displaying means for displaying character information, command input means for inputting a command to vary the speed at which the character information is to be displayed on the information displaying means, the shape of the characters and figures, the colors thereof, or a combination thereof, accoustoelectric transducer means for transducing voice sounds sung in relation to the accompaniment information into electric voice information, and information mixing means for mixing the accompaniment information with the electric voice information. The character information may be displayed on the information displaying means in time with the speed at which the accompaniment information is reproduced, independently of the picture information. The character information may represent a timing at which the song is to be started and a guidance remark relating to an expression for singing. A language of the character information may be able to be switched.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a diagram showing a table of ADPCM sound quality levels and audio characteristics.

FIGS. 14(A) through 14(D) are flowcharts of control programs for controlling operation of the musical accompaniment playback apparatus shown in FIG. 13.

DETAILED DESCRIPTION OF THE PREFERRED EMBODIMENTS

First Embodiment

Figure 1:
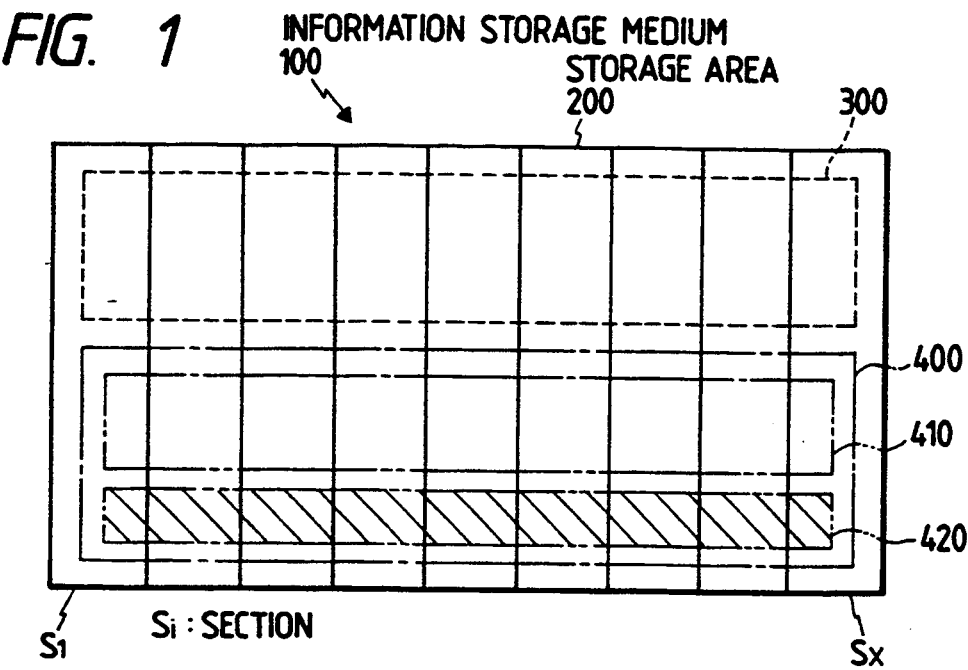
FIG. 1 is a diagram illustrating a first embodiment of the present invention.

FIG. 1 schematically shows a first embodiment of the present invention.

FIG. 1 shows an information storage medium 100, having a storage area 200. The storage area 200 is divided into a plurality of sections $S_1$-$S_x$. Some of the sections $S_1$-$S_x$ store digital audio information 300. The storage area 200 stores digital image information 400 which includes picture information 410 and character information 420. The picture information 410 and the character information 420 are stored independently of each other.

The digital audio information 300 may include accompaniment information of musical accompaniments for songs. The character information 420 may represent information relative to the words of songs to be reproduced in connection with the information of musical accompaniments, in the form of the characters, figures, colors, or a combination thereof.

When the information storage medium 100 is played back to reproduce the information stored in the storage area 200, the digital audio information 300 and the digital image information 400 may be reproduced. The digital image information 400 contains the picture information 410 and the character information 420. The character information 420 may represent information relative to the words of songs to be reproduced in connection with the information of musical accompaniments, with characters, figures, colors, or a combination thereof, as described above. Consequently, when the digital image information 400 is reproduced, the picture information 410 and the character information 420, which represents information relative to the words of songs to be reproduced in connection with the information of musical accompaniments, with characters, figures, colors, or a combination thereof, can be reproduced.

Second Embodiment

Figure 2:
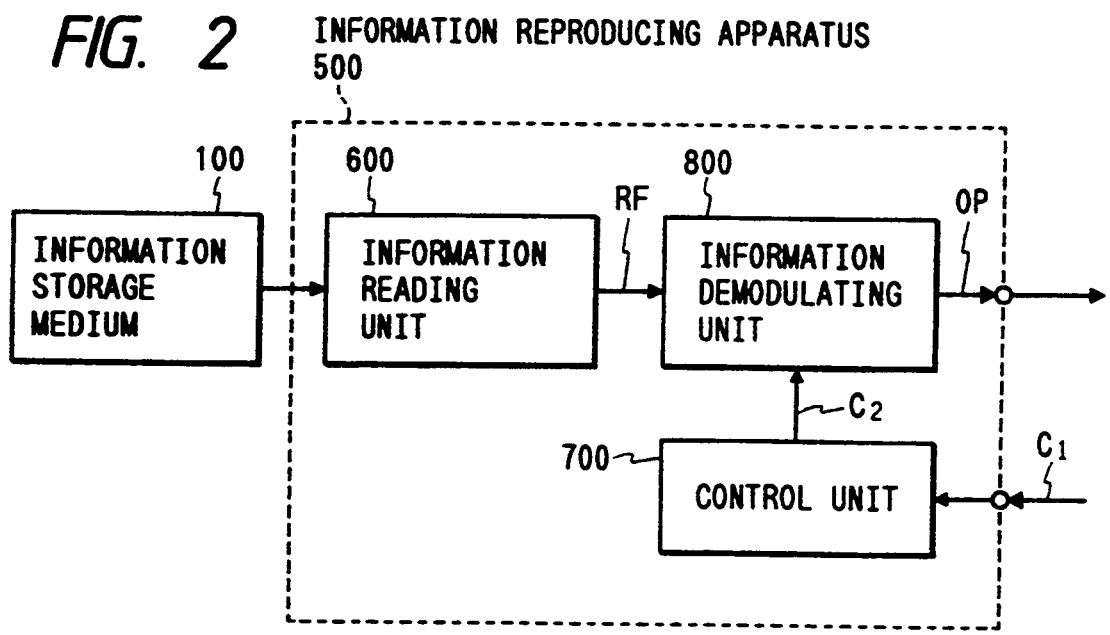
FIG. 2 is a diagram illustrating a second embodiment of the present invention.

FIG. 2 schematically shows a second embodiment of the present invention.

As shown in FIG. 2, the information recorded in the information storage medium 100 can be reproduced by an information reproducing apparatus 500 which comprises a reading information unit 600, a control unit 700, and an information demodulating unit 700.

The information reading unit 600 of the information reproducing apparatus 500 reads information from the information storage medium 100 and outputs the information as a readout signal RF. The information demodulating unit 800 receives the readout signal RF as an input signal, demodulates the input signal, and outputs the demodulated signal as an output signal OP. The control unit 700 outputs a control signal $C_2$ for controlling demodulating and outputting operation of the information demodulating unit 800, in response to an external control signal $C_1$ or according to a built-in program, and transmits the control signal $C_2$ to the information demodulating unit 800 in order to variably control the speed at which the character information 420 is to be output, the shape and colors of characters and figures, or a combination thereof. In response to the control signal $C_2$, the information demodulating unit 800 varies and outputs the speed at which the character information 420 is to be outputted, the shape and colors of characters and figures, or a combination thereof. Therefore, the user of the information reproducing apparatus 500 can have a graphic display unit or the like for displaying the character information 420 as a character image. Since the picture information 410 and the character information are stored independently of each other in the storage area 200 of the information storage medium 100, the user can control only the display of the character information 420 independently of the picture information 410.

Third Embodiment

Figure 3:
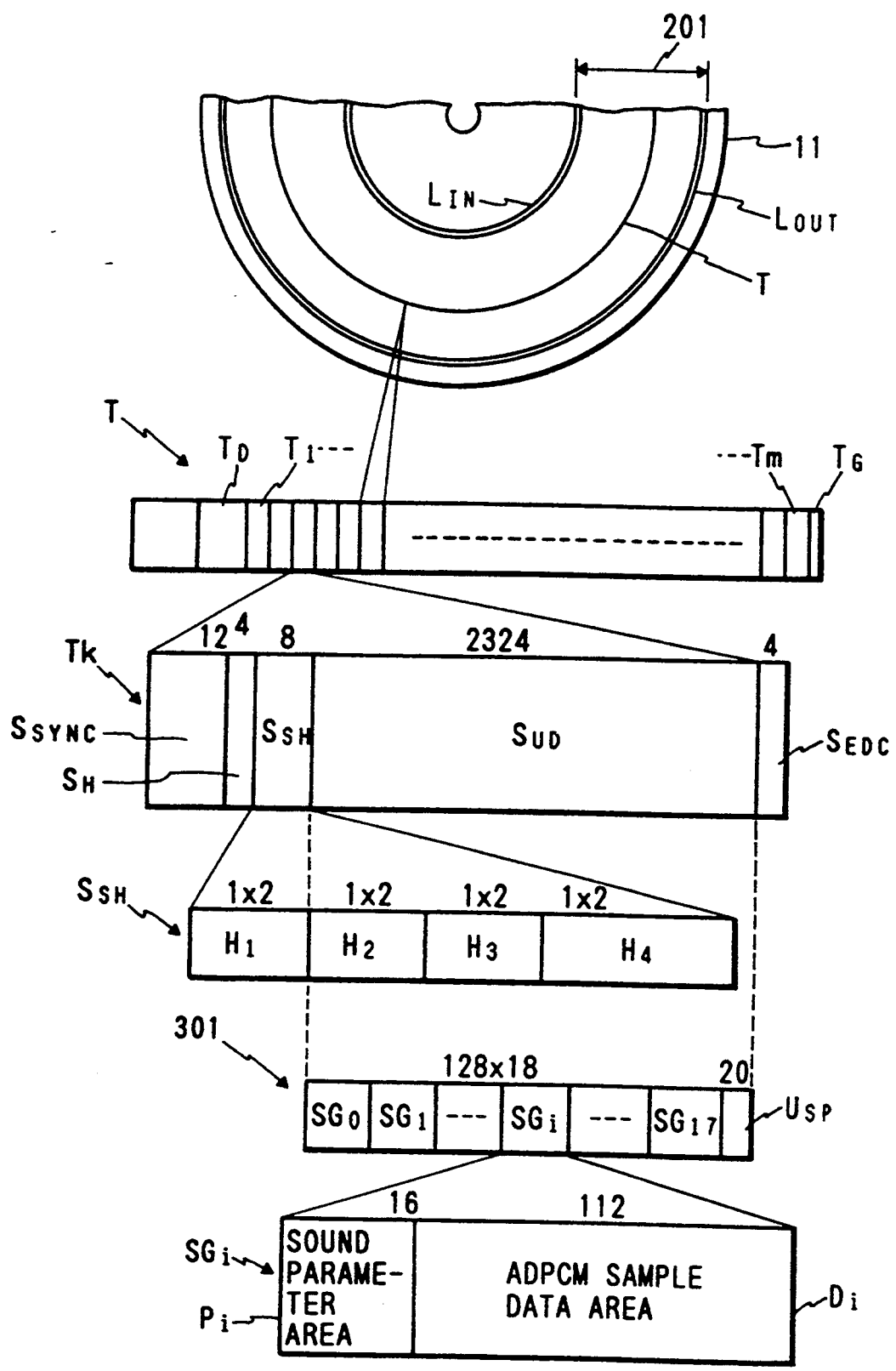
FIG. 3 is a diagram showing a data structure of digital audio information stored in a CD-ROMXA disk as an information storage medium according to a third embodiment of the present invention.

FIG. 3 shows a data structure of an information storage medium used in a third embodiment of the present invention, which is in the form of a CD-ROMXA disk.

A CD-ROM is an information storage medium that employs a compact disk (CD), which has been established as a digital audio disk, as a ROM (read-only memory) for only reading stored digital information. Standards for CD-ROMs were established in 1985. CD-ROMs are finding widespread use in various applications, and are advantageous in that they provide a very large storage capacity, are highly reliable as they operate optically, can access desired information quickly, are available in a large number of duplicates, and can establish an inexpensive reproduction system.

Information storage mediums employ a format based on the CD-ROM and include a CD-I (CD-Interactive) and a CD-ROMXA. Both can record and reproduce voice sound/audio information and image information, which are modulated according to ADPCM (Adaptive Differential Pulse Code Modulation) (see Nikkei Electronics, May 15, 1989, pages 195-200).

The data/sector structure of a storage area for storing audio information in a CD-ROMXA is illustrated in FIG. 3.

According to the CD signal format, 98 frames of subcodes are handled as one block, and one block corresponds to 1/75 second. Since $$44.1 \times 10^3 \times 16 \times 2 \times 1/75 \times \tfrac{1}{8} = 2352,$$

data represented by 2352 bytes can be recorded in one block on a CD. In the above equation, $44.1 \times 10^3$ indicates a sampling frequency, 16 a quantizing number, 2 left and right channels (L and R) of a stereophonic system, 1/75 time (second), and ⅛ a conversion rate between bits and bytes.

On the CD-ROMXA disk, each block is referred to as a sector, and user data are recorded in each sector. There are two standards, Mode 1 and Mode 2 for CD-ROMXA disks depending on the size of the user data area, etc., and there are two standards, Form 1 and Form 2 for Mode 2. In a storage area 201 of the CD-ROMXA disk, a volume descriptor is stored in Mode 1, and image information and voice sound information is stored in Form 2 for Mode 2.

As shown in FIG. 3, the CD-ROMXA disk, designated by 11, has lead-in tracks $L_{IN}$, a storage area 201, and lead-out tracks $L_{OUT}$. In the storage area 201, each track T has a volume descriptor $T_D$, sectors $T_{R1}$-$T_m$, and a gap $T_G$. The volume descriptor $T_D$ is an area for storing an identification code indicating the CD-ROMXA disk, a flag, a startup directory, etc., and is recorded in Model 1 or Model 2 Form 1. The sector $T_1$-$T_m$ (e.g. $T_k$) store image and voice sound or audio signals, and are recorded in Mode 2 Form 2, and each contains a synchronizing signal $S_{SYNC}$, a header $S_H$, a subheader $S_{SH}$, user data $S_{UD}$, and an error detecting code $S_{EDC}$. The synchronizing signal $S_{SYNC}$ is composed of 12 bytes, and serves to distinguish sectors. The header $S_H$ is composed of 4 bytes, three for storing address information similar to the subcodes for CDs, and one for storing mode information. The subheader $S_{SH}$ is composed of 8 bytes, and includes a final number $H_1$, a channel number $H_2$, a submode $H_3$ indicating kids of information stored in each of the sections, and a coding formation $H_4$. Each of these items $H_1$-$H_4$ is composed of 1 byte, and is written twice (i.e., repeated twice).

The user data $S_{UD}$ is composed of 2324 bytes in Form 2 and has sound groups $SG_0$-$SG_n$ is composed of 128 bytes, and the spare unit $U_{SP}$ is composed of 20 bytes. Therefore, there is a total of 18 sound groups in the illustrated embodiment. The sound groups $SG_0$-$SG_n$ are composed of a total of 2304 bytes. The voice sound signals are encoded by ADPCM and recorded in these sound groups $SG_0$-$SG_n$. The error detecting code $S_{EDC}$ is composed of 4 bytes.

Figure 4:
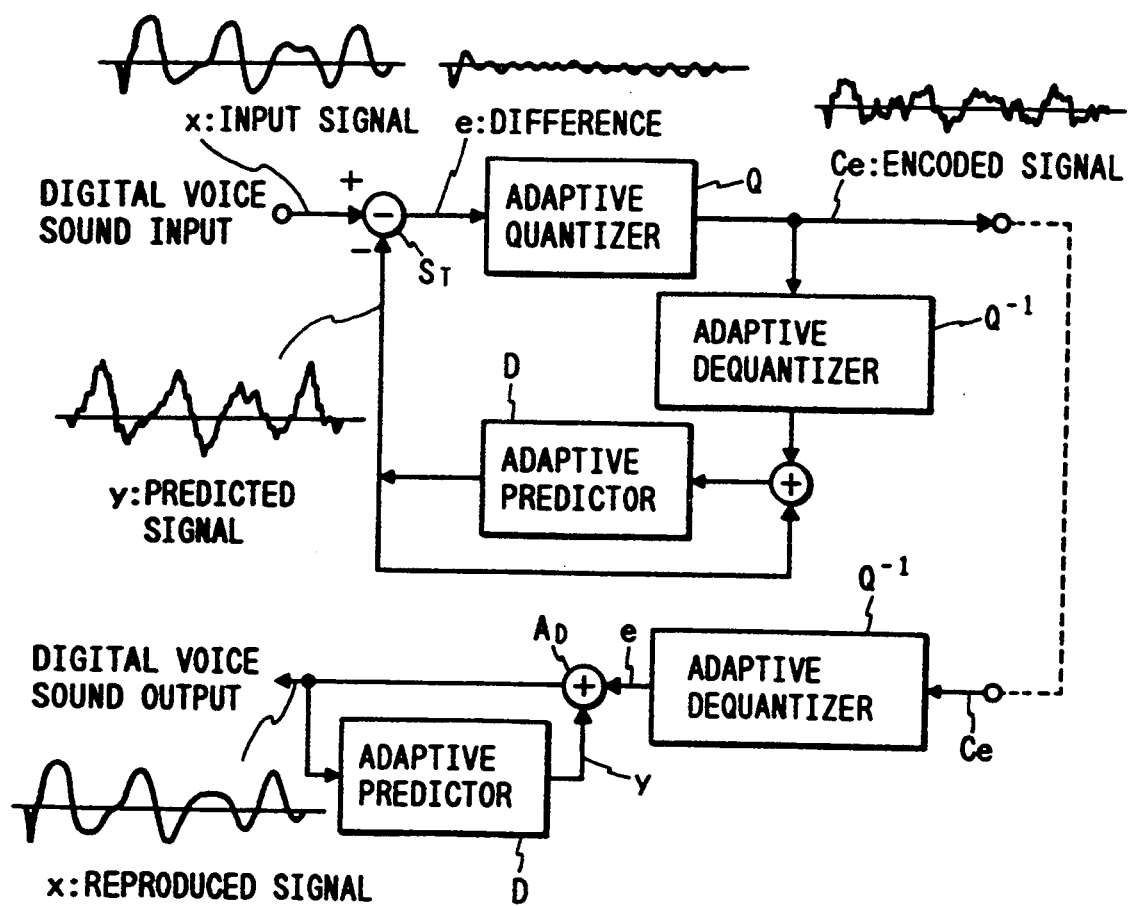
FIG. 4 is a block diagram illustrative of an ADPCM system.

FIG. 4 shows the principles of an ADPCM system. A modulation is carried out as follows. A present input signal is predicted from a past input signal by an adaptive predictor D, and the difference e ($=x-y$) between the predicted signal y and a present input signal x is calculated by a subtractor $S_T$. Then, the difference e is quantized with a plurality of bits and encoded into a coded signal $C_e$ by an adaptive quantizer Q. A demodulation process is carried out in a manner which is the reversal of the above mentioned process. More specifically, the coded signal $C_e$ is decoded back to the difference e by an adaptive dequantiaer $Q^{-1}$. Then, the predicted signal y from the adaptive predictor D and the difference e are added into an output signal x by an adder $A_D$.

The ADPCM system allows audio data to be recorded efficiently with a smaller number of bits. Audio characteristics vary depending on the bit reduction ratio (data compression ratio). FIG. 5 shows the relationship between ADPCM sound quality levels and audio characteristics. It can be seen from FIG. 5 that the bit reduction ratio in the sound quality level A is ½ for stereophonic reproduction and ¼ for monaural reproduction, the bit reduction ratio in the sound quality level B is ¼ for stereophonic reproduction and ⅛ for monaural reproduction, and the bit reduction ratio in the sound quality level C is ⅛ for stereophonic reproduction and 1/16 for monaural reproduction. If the bit reduction ratio is ¼, then the required storage capacity may be ¼ of the conventional storage capacity, and the remaining ¾ storage capacity may be used to store other data.

In FIG. 3, each sound group $SG_i$ is composed of 128 bytes, and has a sound parameter area $P_i$ and an ADPCM sample data area $D_i$. The sound parameter area $P_i$ has a storage capacity of 16 bytes, and stores a coefficient of a predictive filter in the adaptive predictor D shown in FIG. 4. The ADPCM sample data area $D_i$ has a storage capacity of 112 bytes, and stores data sampled by the ADPCM system. Therefore, one sector has an overall data storage capacity of 2016 bytes ($=112\times18$). If data are to be stored in the ADPCM sound quality level B for stereophonic reproduction, then 504 bytes will be required to store the data because $$37.8\times10^3\times4\times2\times1/75\times\tfrac{1}{4}=504.$$

Therefore, since $2016\div504=4$, data which are four times greater than the data possible with the conventional storage system can be stored. Stated otherwise, voice sound and audio signals for four channels can be stored. The first channel is stored in the sectors $T_1$, $T_5$, $T_9$, ..., $T_{4h+1}$ (h is an integer of 0 or more). The second channel is stored in sectors $T_2$, $T_6$, $T_{10}$, ..., $T_{4h+2}$. The third channel is stored in sectors $T_3$, $T_7$, $T_{11}$, ..., $T_{4h+3}$. The fourth channel is stored in sectors $T_4$, $T_8$, $T_{12}$, ..., $T_{4h+4}$.

In this manner, musical accompaniments of karaoke music pieces, which correspond to the music piece information, are pulse-code-modulated and stored in the ADPCM sample data area $D_i$.

Figure 6:
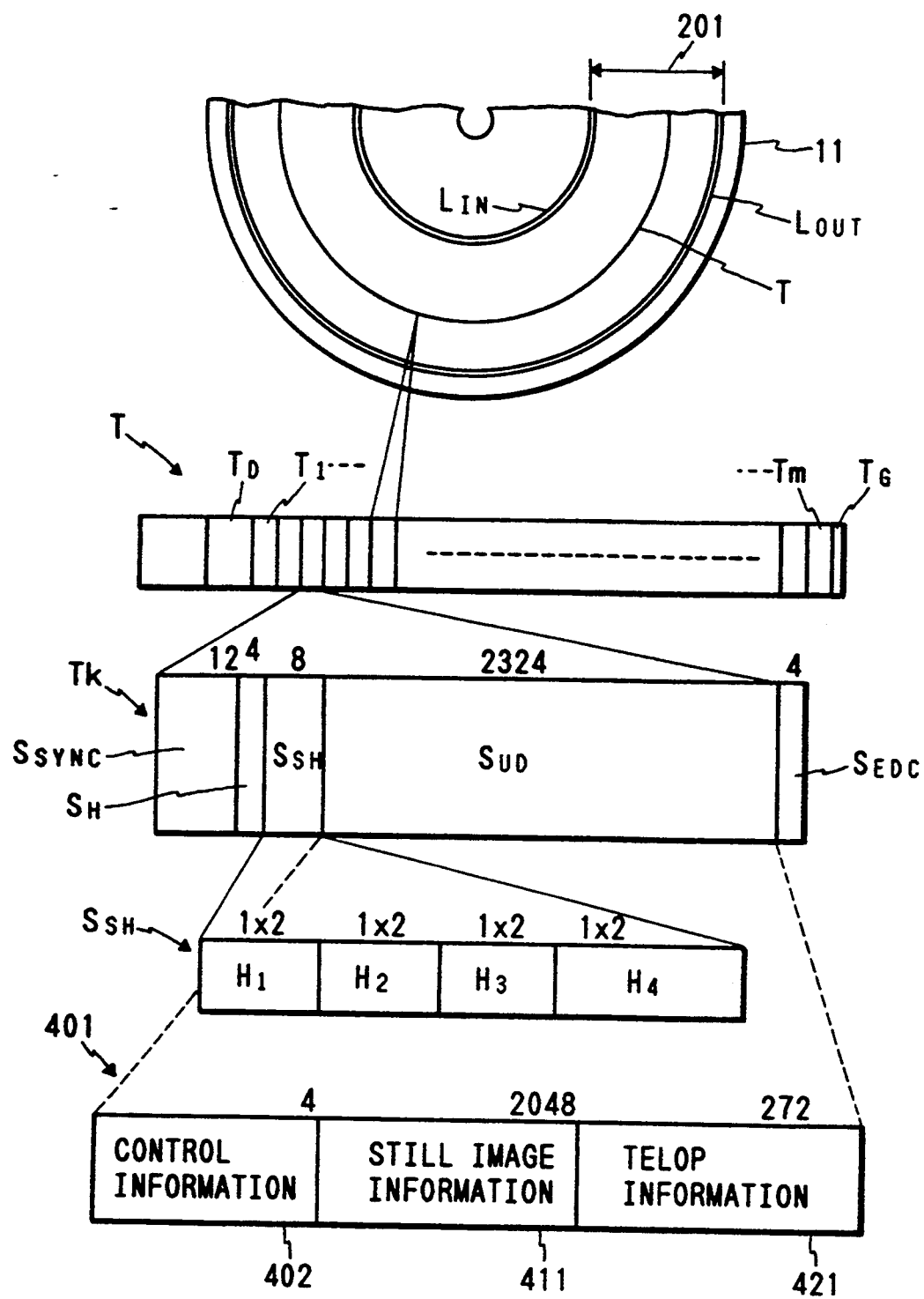
FIG. 6 is a diagram showing a data structure of digital image information stored in the CD-ROMXA disk shown in FIG. 3.

FIG. 6 shows, by way of example, a data structure of the digital image information 401 which is stored in the area of the user data $S_{UD}$ (2324 bytes). The user data $S_{UD}$ (2324 bytes) has control information 402, still image information 411, and telop (superimposed character) information 421.

The control information 402 is composed of 4 bytes, and provided for each sector, i.e., every 1/75 second. The control information 402 is used to control the start of display of still images, the turning ON/OFF of telop information such as words of songs, and color changes of telop information. The still image information 411 is composed of 2048 bytes, and contains information about still images and figures. The telop information 421 is composed of 272 bytes, and stores character information about words of songs independently of still images and figures.

Figure 7:
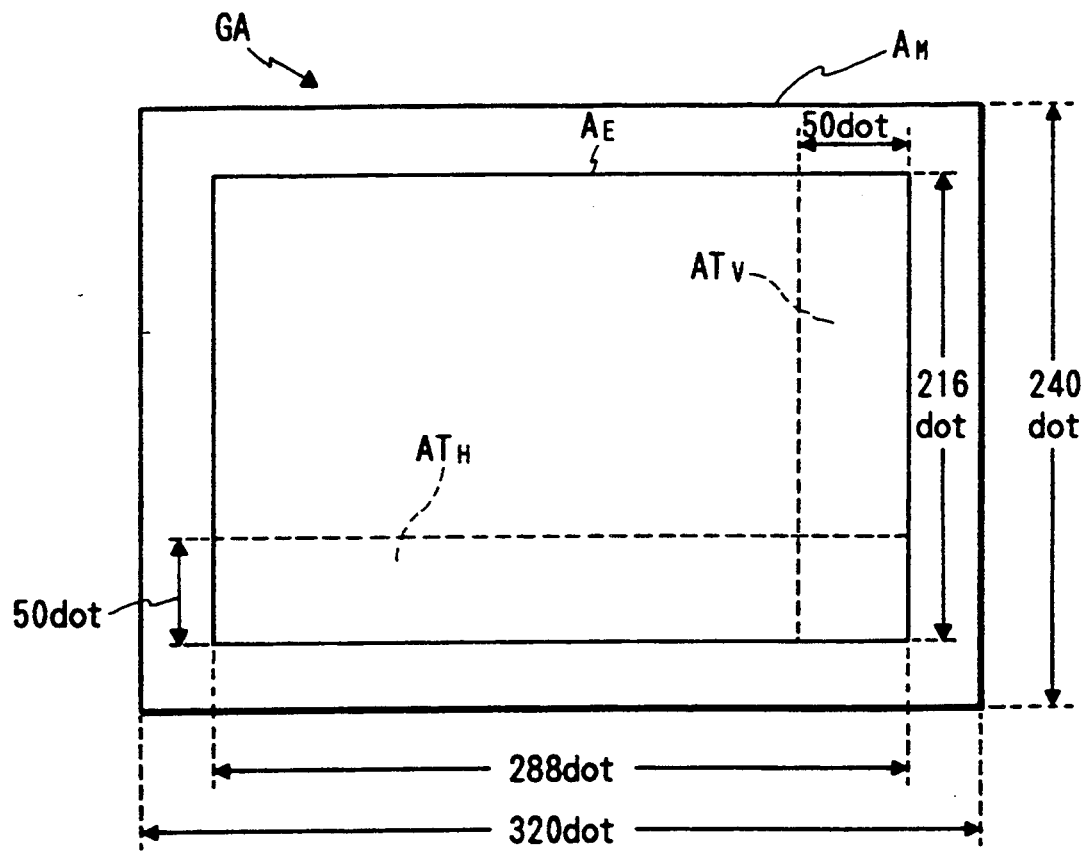
FIG. 7 is a view of a screen for displaying an image.

A display screen will be described below with reference to FIG. 7. A graphic display unit has a screen GA including a maximum screen range $A_M$ defined by 320 dots in a horizontal direction and 240 dots in a vertical direction, and is composed of a total of 76800 ($=320\times240$) pixel (picture elements). Actually, the graphic display unit employs, for image reproduction, an effective screen range $A_E$ which is smaller than the maximum screen range $A_M$. The effective screen range $A_E$ is defined by 288 bits in a horizontal direction and 216 dots in a vertical direction, and is composed of a total of 62208 ($=288\times216$) pixels. Control information of 8 bits (1 byte) is needed to display one pixel. Therefore, still image information of 76800 bytes is necessary per screen frame to display an image on the maximum screen range $A_M$, and still image information of 62208 bytes is necessary per screen frame to display an image on the effective screen range $A_E$.

Telop information, which displays characters such as words of songs and figures relative to words of songs separately from still images, can be displayed horizontally in a horizontal display area $AT_H$ and vertically in a vertical display area $AT_V$. The horizontal display area $AT_H$ is defined by 288 dots in a horizontal direction and 50 dots in a vertical direction, and contains a total of 14400 ($=288\times50$) pixels. The vertical display area $AT_V$ is defined by 50 dots in a horizontal direction and 216 dots in a vertical direction, and contains a total of 10800 ($=50\times216$) pixels. To display one pixel of telop information, color information of 2 bits are required. Therefore, telop information of 28800 bits, i.e., 3600 bytes are required to display a telop message in the horizontal display area $AT_H$, and telop information of 21600 bits, i.e., 2700 bytes, are required to display a telop message in the vertical display area $AT_V$.

Figures 8A, 8B, 8C:
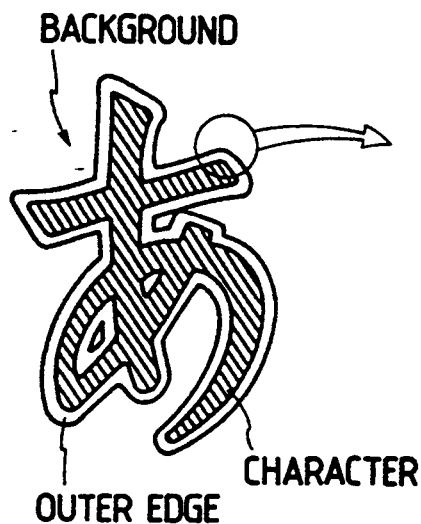
FIGS. 8(A), 8(B), and 8(C) are diagrams illustrative of the manner in which color information is allotted to display one pixel in a frame.

Allotment of color information for the display of one pixel of telop information will be described below with reference to FIGS. 8(A), 8(B), and 8(C). Color information of 2 bits represents four pieces I–IV of color information. As shown in FIG. 8(C), the color information I designates the color of a background. The color information II designates the color of a character. The color information III designates the color of an outer edge of a character. The color information IV designates a color assigned to a character as it changes in color when words of a song are successively indicated while the song is in progress. The background, the character, and the outer edge are shown in FIG. 8(A). FIG. 8(A) shows one of the Japanese syllabaries which represents pronunciation [a]. FIG. 8(B) illustrates, in an enlarged scale, an encircled portion in FIG. 8(A). In FIG. 8(B), elements indicated by I represent the background, elements indicated by II represent the character, and elements indicated by III represent the outer edge as shown in FIG. 8(C).

Figure 9:
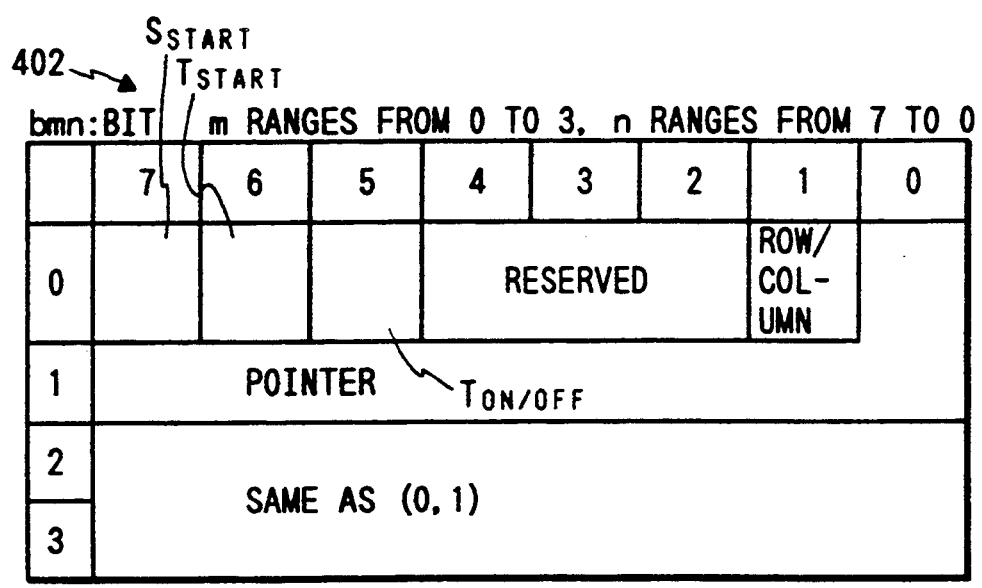
FIG. 9 is a diagram showing a data structure of control information shown in FIG. 6.

FIG. 9 shows a data structure of the control information 402. The control information 402 contains information of 4 bytes (32 bits), and is composed of twice written information (each 16 bits). Of the 16 bits, the first one bit $b_{07}$ is designated by $S_{START}$ and is information indicating the beginning of still image data. The next one bit $b_{06}$ is designated by $T_{START}$ and is information indicating the beginning of telop information. The next one bit $b_{05}$ is designated by $T_{ON/OFF}$ and is information for controlling the turning ON/OFF of telop information. The next one bit $b_{01}$ is information for controlling rows/columns of telop information. The nine bits $b_{00}$, $b_{10}$,–$b_{17}$ are pointer information indicating the position where the telop message such as words of songs varies changes in color.

Figure 10:
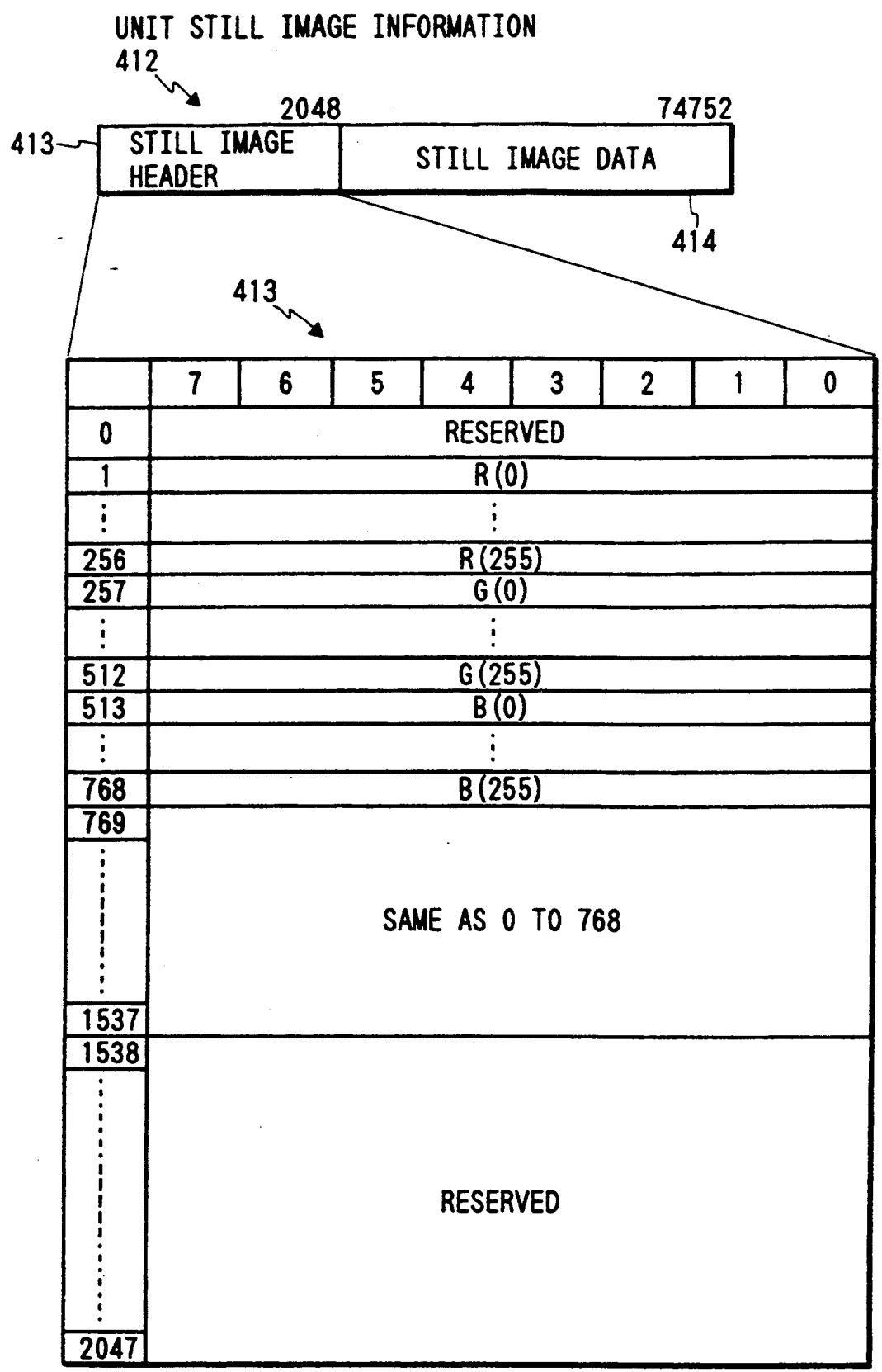
FIG. 10 is a diagram showing an arrangement of a unit still image information shown in FIG. 6.

FIG. 10 shows unit still image information 412 which is a collection of 37.5 sectors of the still image information 411 (2048 bytes) shown in FIG. 6. The unit still image information 412 is composed of 76800 bytes ($=2048\times37.5$) which are necessary to display one frame in the maximum screen range $A_M$ shown in FIG. 7. The unit still image information 412 has a still image header 413 and still image data 414. The still image header 413 is composed of 2048 bytes, and represents palette information for indicating colors to be displayed in pixels. The still image header 413 is arranged as follows: As shown in FIG. 10, the first byte is reserved. Of the following 768 bytes, the first 256 bytes are palette information indicating 256 colors related to R (red), the next 256 bytes are palette information indicating 256 colors related to G (green), and the final 256 bytes are palette information indicating 256 colors related to B (blue). The next 769 ($=1+3\times256$) bytes are information which is identical to the above 769 bytes. Final bytes 510 are reserved. Part of the palette information is allotted to the display of telop information. The still image data 414 is composed of 74752 bytes, and stores control information relative to brightness or the like that is necessary to display pixels other than colors.

Figure 11:
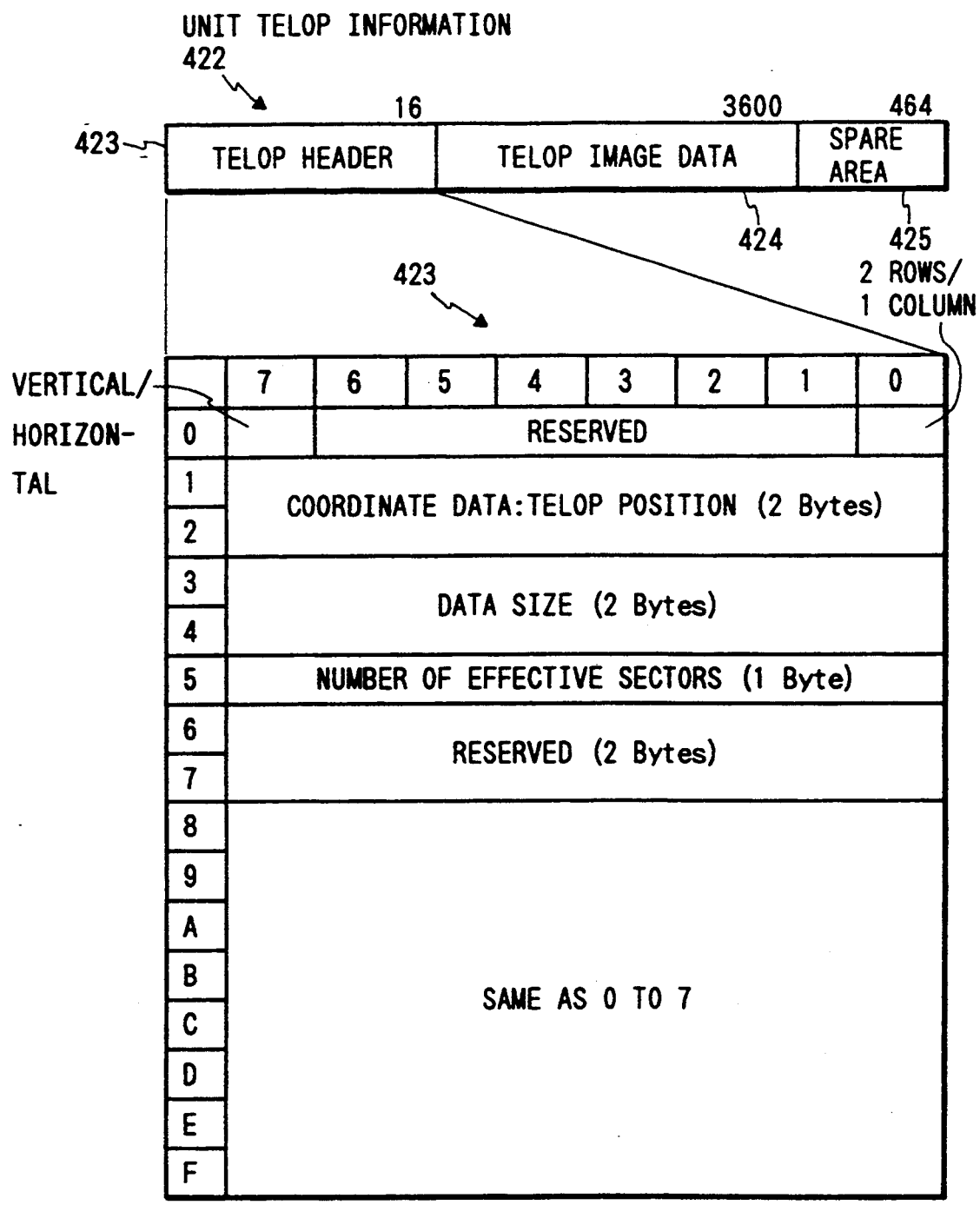
FIG. 11 is a diagram showing an arrangement of a unit telop information shown in FIG. 6.

FIG. 11 shows unit telop information 422 which is a collection of 15 sectors of the telop information 421 (272 bytes) shown in FIG. 6. The unit telop information 422 is composed of 4080 bytes ($=272\times15$), and has a telop header 423, telop image data 424, and a spare area 425. The telop header 423 is composed of 16 bytes, and is always stored ahead of the telop image data 424, and is information for controlling the telop image data. The telop header 423 is arranged as follows: Of the first byte, the first bit is information indicating whether the telop message is to be displayed vertically or horizontally. The final bit of the first byte is information indicating whether the telop message is to be displayed in two rows or one row. Two bytes following the first byte are used to store coordinate information indicating the position of the telop message. Two bytes following the coordinate information bytes are used to store information designating a data size. A next byte stores information indicating the number of effective sectors. The following two bytes are reserved. Eight bytes marked with 8, 9, A–F store information which is identical to the above information. The telop image data 424 has a maximum of 3600 bytes for displaying the horizontal telop display area $AT_H$ shown in FIG. 7. Therefore, the telop image data 424 is composed of as many bytes as necessary to display a telop message in the vertical display area $AT_V$ or the horizontal display area $AT_H$ shown in FIG.

Figure 12:
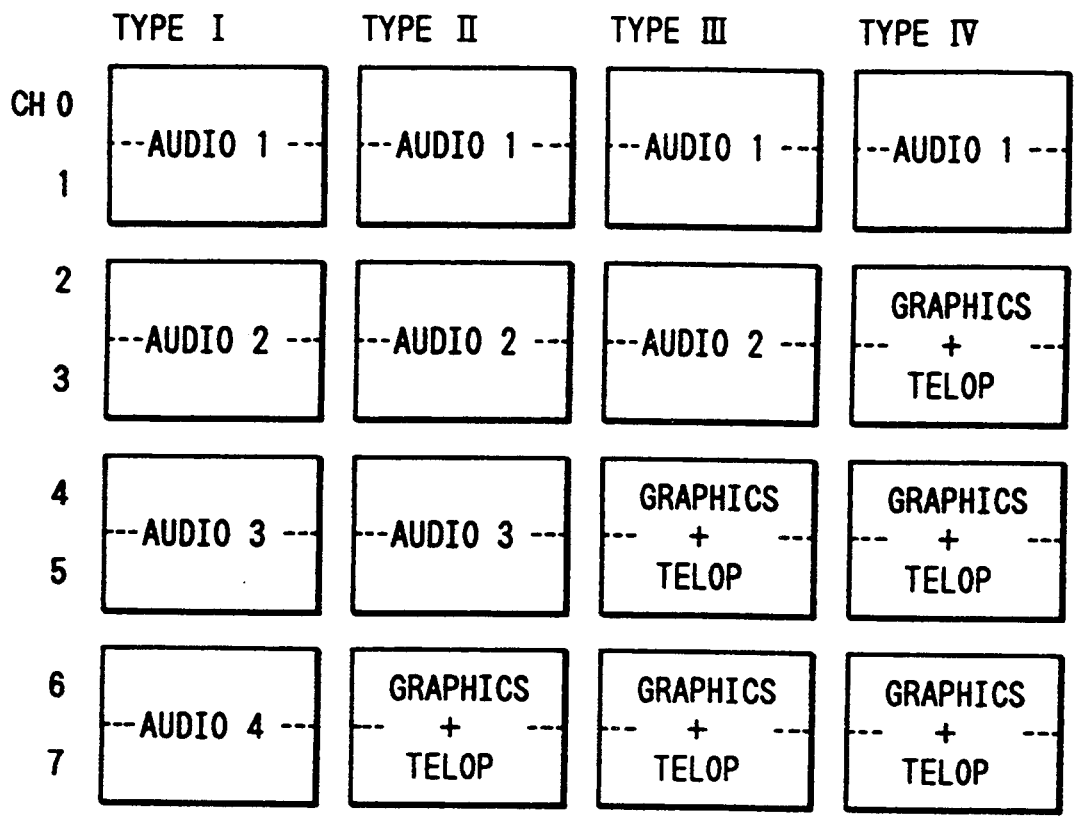
FIG. 12 is a diagram showing, by way of example, types in which digital audio information and digital image information are stored.

As described above, digital audio information and digital image information are stored in the CD-ROMXA disk 11. FIG. 12 shows, by way of example, types in which digital audio information and digital image information are stored. In Type I, four channels are all assigned to digital audio information. Type I corresponds to the storage of data in the sound quality level B for stereophonic reproduction in each channel according to the ADPCM system. In Type II, three out of four channels are assigned to digital audio information, the remaining one channel is assigned to digital image information. Therefore, 18.75 sectors ($75\times\frac{1}{4}$) of information are allotted to the display of an image per second. Since 37.5 sectors of information are necessary in order to display one frame of image, two seconds are required to complete one frame of the image because $37.5 \div 18.75 = 2$. In Type III, two channels are assigned to digital audio information, and two channels are assigned to digital image information. Inasmuch as 37.5 sectors of information are assigned to the display of an image per second, as described above, one frame of image is completed in one second because $37.5 \div 37.5 = 1$. In Type VI, one channel is assigned to digital audio information, and three channels (56.25 sectors) are assigned to digital image information. Thus, one frame of image can be displayed in 0.67 second because $37.5 \div 56.25 = 0.67$. Since one frame of telop information is displayed with 15 sectors of information, as described above, 1.25 frames (=18.75 sectors) of telop information can be displayed in Type II, 2.5 frames (=37.5 sectors) of telop information can be displayed in Type III, and 3.75 frames (=56.25 sectors) of telop information can be displayed in Type IV. Therefore, regardless of the speed at which other image information is displayed, one telop frame can be displayed in 1.6 seconds in Type II. Likewise, one telop frame can be displayed in 0.4 second in Type III, and one telop frame can be displayed in 0.27 second in Type IV.

Fourth Embodiment

Figure 13:
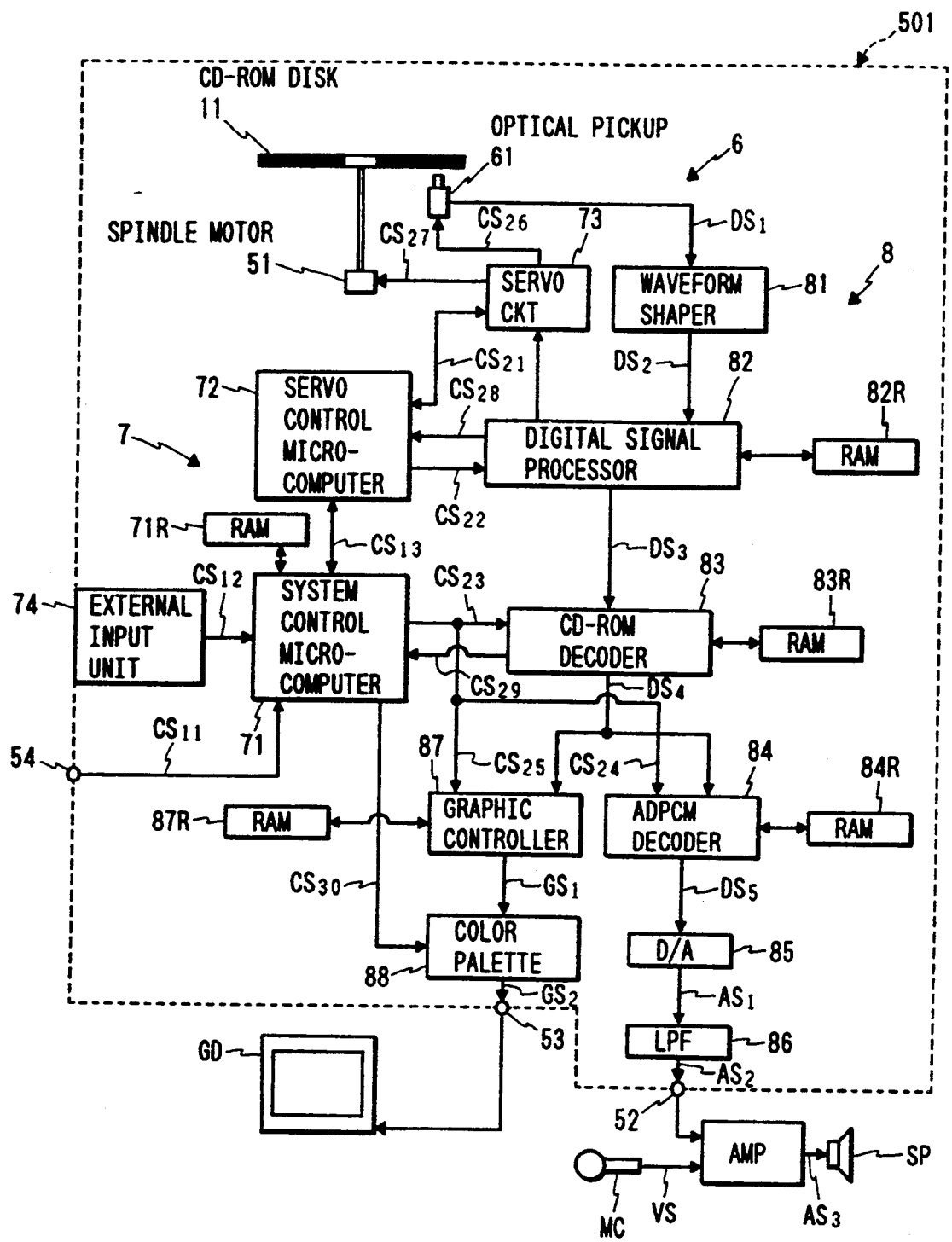
FIG. 13 is a block diagram of a karaoke or musical accompaniment playback apparatus as an apparatus for reproducing information according to a fourth embodiment of the present invention.

FIG. 13 shows in block form an apparatus for reproducing information as a fourth embodiment of the present invention. The information reproducing apparatus shown in FIG. 13 is incorporated in a karaoke or musical accompaniment playback apparatus 501.

As shown in FIG. 13, the musical accompaniment playback apparatus 501 comprises an optical pickup 61 as a means for reading information, a control block 7 as a control means, a spindle motor 51, a demodulator block 8, and external terminals 52, 53, 54.

The control block 7 comprises a system control microcomputer 71, a RAM (random access memory) 71R, a servo control microcomputer 72, a servo circuit 73, and an external input unit 74.

The demodulator block 8 has a waveform shaper 81, a digital signal processor 82, a RAM 82R, a CD-ROM decoder 83, a RAM 83R, an ADPCM decoder 84, a RAM 84R, a D/A converter 85, a low-pass filter 86, a graphic controller 87, a RAM 87R, and a color palette 88.

An external amplifier AMP may be connected to the external terminal 52, and an external microphone MC and an external loudspeaker SP may be connected to the external amplifier AMP.

A graphic display unit GD may be connected to the external terminal 53. An external control unit such as a microcomputer may be coupled to the external terminal 54.

The musical accompaniment playback apparatus 501 operates as follows:

A CD-ROM disk 11 is rotated about its own axis by the spindle motor 51. The optical pickup 61 reads a digital signal represented by a sequence of pits from the recording surface of the CD-ROM disk 11. The digital signal, designated by $DS_1$, read by the optical pickup 61 is supplied to the waveform shaper 81 by which the waveform of the digital signal is shaped. The shaped digital signal is then applied as a digital signal $DS_2$ to the digital signal processor 82. In the digital signal processor 82, the edges of an EFM signal are detected, using a reference clock signal generated by a quartz crystal oscillator, thereby reproducing a sequence of data. From the reproduced sequence of data, there is detected a frame synchronizing signal, based on which the structure of frame data is exactly reproduced. The frame data are converted into 8-bit symbol data by EFM demodulation, and written into the RAM 82R. The data stored in the RAM 82R are then deinterleaved. Thereafter, an error correcting process is effected on the data. The corrected data are then sent as a signal $DS_3$ from the digital signal processor 82 to the CD-ROM decoder 83. In the CD-ROM decoder 83, addresses are sought according to the absolute time of the subcode, synchronizing signals in the data are detected, and the data are unscrambled. Then, the header address is checked, and a desired sector is accessed. The user data which are obtained are subjected to error detection and correction processes, after which the corrected data are supplied as a signal $DS_4$ to the ADPCM decoder 84.

The ADPCM decoder 84 has an adaptive dequantizer and adaptive predictor (not shown), and demodulates the signal $DS_4$ into a digital signal and supplies the demodulated signal as a signal $DS_5$ to the D/A converter 85.

The D/A converter 85 converts the demodulated signal $DS_5$ into an analog signal, and sends the analog signal as a signal $AS_1$ to the low-pass filter 86. The low-pass filter 86 processes the signal $AS_1$ into an accurate signal $AS_2$ and applies the signal $AS_2$ to the external terminal 52.

The analog signal $AS_2$, which is an audio output signal from the musical accompaniment playback apparatus 501, is applied to the external amplifier AMP. Voice sounds applied to the external microphone MC are converted thereby into a microphone voice signal VS. The external amplifier AMP adjusts the frequency characteristics of the analog signal $AS_2$ and also mixes the analog signal $AS_2$ with the microphone voice signal VS. Then, the external amplifier AMP amplifies the mixed signal to a suitable level, and then sends the amplified signal as a signal $AS_3$ to the external loudspeaker SP. The external loudspeaker SP converts the signal $AS_3$ into audible sounds which are radiated from the external loudspeaker.

The signal $DS_4$, outputted from the CD-ROM decoder 83, is also transmitted to the graphic controller 87. In cases where image information is stored in the user data $S_{UD}$ of the CD-ROM disk 11, the graphic controller 87 extracts an image signal representing the image information contained in the signal $DS_4$, and outputs the extracted image signal as a graphic signal $GS_1$. The graphic signal $GS_1$ is then supplied to the color palette 88. The color palette 88 adjusts or adds the color represented by the graphic signal $GS_1$, and outputs it as a graphic signal $GS_2$ to the external terminal 53. The graphic signal $GS_2$, which is an image output signal from the musical accompaniment playback apparatus 501, is applied to the graphic display unit GD. The graphic display unit GD displays an image represented by the graphic signal $GS_2$.

The system control microcomputer 71 applies a control signal $CS_{13}$ to the servo control microcomputer 72 according to control signal $CS_{12}$ supplied from the external input unit 74, a control signal $CS_{11}$ supplied from the external terminal 54, or a control program stored in the system control microcomputer 71. The system control microcomputer 71 also controls the CD-ROM decoder 83, the ADPCM decoder 84, the graphic controller 87, and the color palette 88 with respective control signals $CS_{23}$, $CS_{24}$, $CS_{25}$, $CS_{30}$. The system control microcomputer 71 receives FILE-TOC data as a control signal $CS_{29}$ from the CD-ROM decoder 83, and stores the data in the RAM 71R. The FILE-TOC data are stored as the user data $S_{UD}$ in the CD-ROMXA disk, ahead of the digital audio information 300 and the digital image information 400, and represents an information table relative to the contents of the digital audio information 300 and the digital image information 400. The servo control microcomputer 72 receives the control signal $CS_{13}$ from the system control microcomputer 71, and also receives a subcode signal $CS_{28}$ from the digital signal processor 82. The servo control microcomputer 72 controls the digital signal processor 82 and the servo circuit 73 with respective control signals $CS_{22}$, $CS_{21}$. The servo circuit 73 is responsive to the control signal $CS_{21}$ from the servo control microcomputer 72 to control the optical pickup 61 and the spindle motor 51 with respective control signals $CS_{26}$, $CS_{27}$.

Operation of the musical accompaniment playback apparatus 501 which is loaded with the CD-ROM disk 11 will now be described below with reference to FIGS. 13 and 14(A) through 14(D).

Figure 14A:
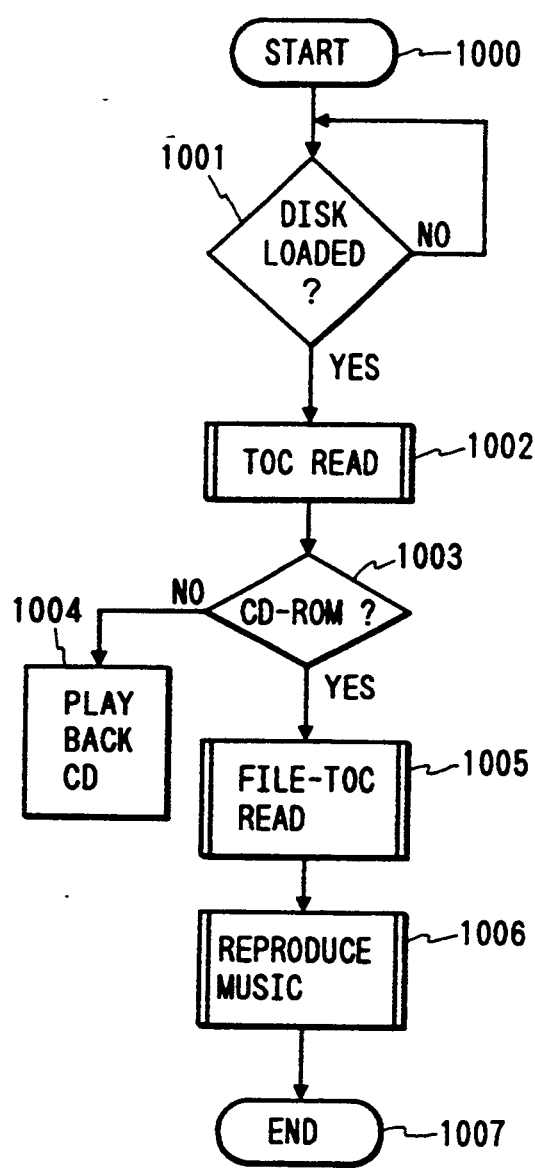

As shown in FIG. 14(A), the musical accompaniment playback apparatus 501 starts to operate at a step 1000, and then determines whether a disk is loaded or not in a step 1001. If a disk is loaded, then control goes from the step 1001 to a step 1002 which is a subroutine for reading a TOC stored in the lead-in tracks of the loaded disk. After the step 1002, the step 1003 determines whether the loaded disk is an ordinary CD, then control goes to a step 1004 in which the CD is played back. If the loaded disk is a CD-ROM, then control proceeds to a step 1005 which is a subroutine for reading the FILE-TOC data from the FILE-TOC of the disk. After the step 1005, control goes to a step 1006 which is a subroutine for selecting and reproducing a desired music piece in a playback mode. The sequence shown in FIG. 14(A) ends at a step 1007.

Figure 14B:
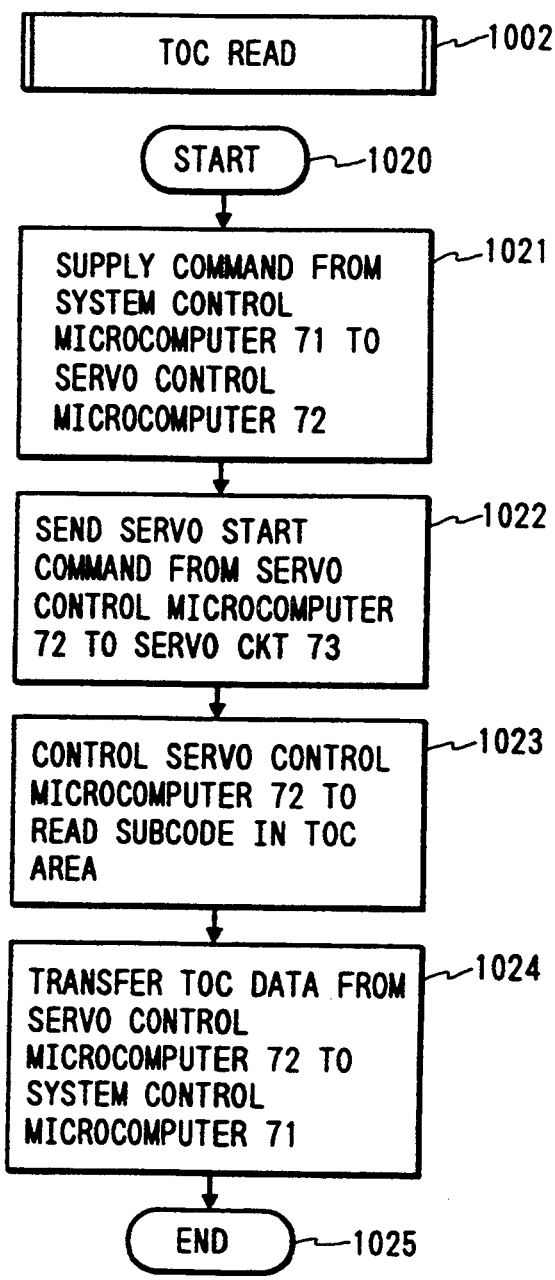

The subroutine in the step 1002 for reading the TOC is started in a step 1020 in FIG. 14(B). In a step 1021, a command signal is applied to the servo control microcomputer 72 from the system control microcomputer 71 to supply a servo operation start command from the servo control microcomputer 72 to the servo circuit 73 in a step 1022, thus controlling the optical pickup 61 for tracking under servo control. The servo control microcomputer 72 reads subcodes in the TOC area on the lead-in tracks of the CD-ROM disk 11 in a step 1023. The TOC data are transferred from the servo control microcomputer 72 to the system control microcomputer 71 in a step 1024. The subroutine shown in FIG. 14(B) is finished in a step 1025.

The subroutine in the step 1005 for reading the FILE-TOC data is started in a step 1050 in FIG. 14(C). A search/reproduction command is applied to the servo control microcomputer 72 from the system control microcomputer 71 in a step 1051. Then, the servo control microcomputer 72 applies a search/reproduction command to the servo circuit 73 in a step 1052. The digital signal processor 82 transfers the FILE-TOC data to the CD-ROM decoder 83 in a step 1053. The CD-ROM decoder 83 decodes the FILE-TOC data, and the decoded FILE-TOC data are transferred from the CD-ROM decoder 83 to the system control microcomputer 71 in a step 1054. The system control microcomputer 71 stores the transferred FILE-TOC data in the RAM 71R in a step 1055. The subroutine shown in FIG. 14(C) is brought to an end in a step 1056.

The subroutine in the step 1006 will be described below with reference to FIG. 14(D). After the subroutine is started in a step 1060, a search/playback command is transmitted from the system control microcomputer 71 to the servo control microcomputer 72 in a step 1061. Then, in a step 1062, the system control microcomputer 71 effects a control process to read and reproduce audio data or still image data from the RAMs 82R, 83R, 84R. The system control microcomputer 71 also effects a control process to read and reproduce only telop data from the RAM 87R in a step 1063. A next step 1064 determines whether a key is depressed or not. A reproducing process is now carried out in a step 1065. The sequence shown in FIG. 14(D) ends in a step 1066.

Display operation of the musical accompaniment playback apparatus 501 which is loaded with the CD-ROM disk 11 will be described below with reference to FIGS. 15 and 16.

Figure 15:
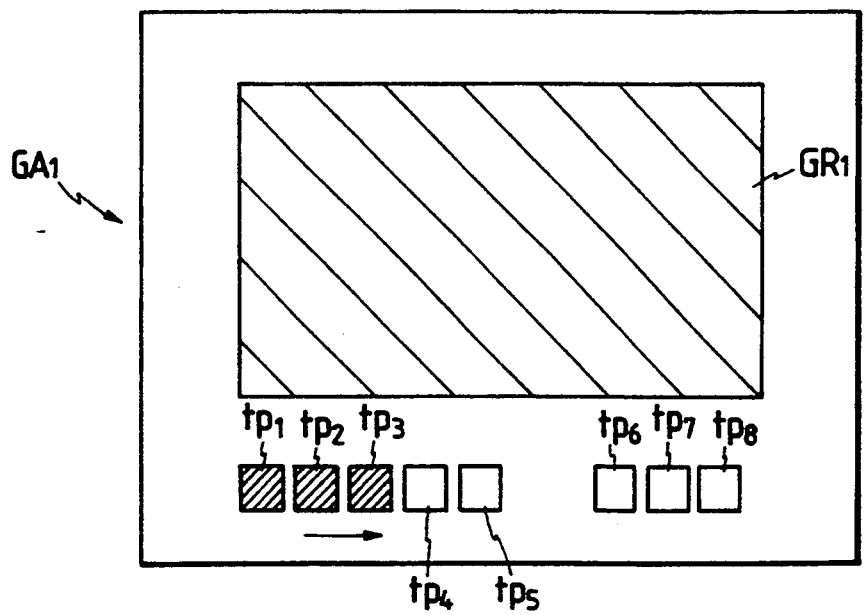
FIGS. 15 and 16 are diagrams showing, by way of example, information displayed on a graphic display unit during operation of the musical accompaniment playback apparatus.

FIG. 15 shows an image frame $GA_1$ displayed on the graphic display unit GD. The displayed image frame $GA_1$ contains a still image $GR_1$ and word-of-song telop pieces $tp_1$–$tp_8$. In FIG. 15, as a musical accompaniment for a song is progressively played back, the word-of-song telop pieces $tp_1$ through $tp_3$ have changed in color. Thereafter, the word-of-song telop pieces $tp_4$, $tp_5$ will change in color in time with the musical accompaniment being played back, thereby indicating, to the user, the position where the song is to be sung. Rather than changing in color, the word-of-song telop pieces may initially be displayed in a smaller size, and may subsequently be displayed in a greater size as the song progresses.

Figure 16:
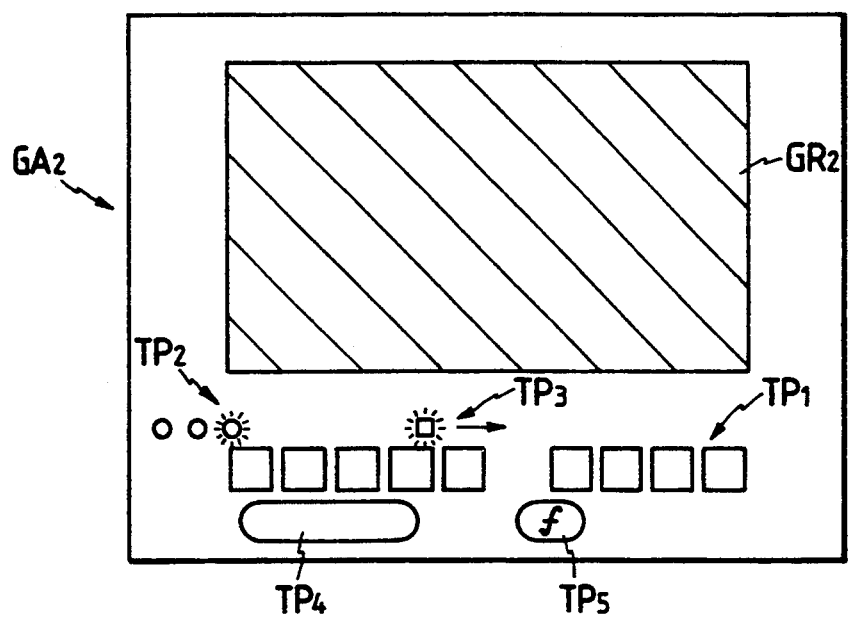

FIG. 16 shows another image frame $GA_2$ displayed on the graphic display unit GD. The displayed image frame $GA_2$ contains a still image $GR_2$ and telop pieces $TP_1$–$TP_5$. The telop piece $TP_1$ represents words of a song. The telop piece $TP_2$ represents a point where a song is to be started. In the illustrated example, the telop piece $TP_2$ is composed of three circular dots which are successively turned on in the order of "1", "2", "3", and a song is to start when the third circular dot is turned on. The telop piece $TP_3$ is a moving cursor which is positioned directly above the words that should be sung while the song is in progress. The telop $TP_4$ represents guidance information for giving the singer certain guidance remarks (e.g., "sing with more emotion," "sing louder," etc.) to be noted in the singing. The telop piece $TP_5$ is indicative of various music symbols such as f (forte), p (piano), etc.

In the displayed image frames, the still images $GR_1$, $GR_2$ and the telop pieces $tp_1$–$tp_8$, $TP_1$–$TP_5$ are displayed independently of each other under the control of the control block 7 (FIG. 13).

In the above embodiment, the telop information which is character information has been described as indicating words of songs to be sung with corresponding musical accompaniments. However, the telop information may be other information regarding music pieces or songs. The telop information may be represented in Japanese or any of various other languages such as English.

The CD-ROMXA disk has been employed as the information storage medium in the above embodiment. However, the information storage medium may be of any of various other forms including a CD-ROM, a CD-I, an ordinary CD, a DAT (digital audio tape), an IC card, and a read-only memory of another type.

With embodiment of the present invention, as described above, the user of the musical accompaniment playback apparatus can control the musical accompaniment playback apparatus to display image information indicating words of songs recorded in an information storage medium, independently of other image information displayed on the apparatus. The information storage medium and the musical accompaniment playback apparatus are particularly suitable for use in passenger cars.

Since the information storage medium is a digital information storage medium such as a CD-ROMXA, an ordinary CD, or the like, the data stored in the information storage medium can be accessed in a short period of time.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information storage medium comprising a storage area divided into a plurality of sections, for storing digital audio information and digital image information, said digital image information containing digital picture information and digital character information, said digital picture information and said digital character information being stored separately and independently of each other and separately and independently of said digital audio information, and a proportion of storage capacities of the digital audio information and the digital image information being alterable.

2. An information storage medium according to claim 1, wherein said digital audio information includes accompaniment information which represents musical accompaniments relative to songs, and said character information includes information which represents words of the songs to be reproduced in time with said musical accompaniments, in the form of characters, figures, colors, or a combination thereof.

3. An information storage medium according to claim 2, wherein said information storage medium includes an optical storage disk according to Adaptive Differential Pulse Code Modulation system.

4. An information storage medium according to claim 1, wherein each of said plurality of sections comprises an identification area for indicating kinds of information stored in each of said sections.

5. An information storage medium according to claim 1, wherein said information storage medium is designed to store both digital audio information and digital image information.

6. An apparatus for reproducing information from an information storage medium comprising a storage area divided into a plurality of sections, for storing digital audio information and digital image information, said digital image information containing picture information and character information stored separately and independently of each other, said apparatus comprising:
information reading means for reading information from said information storage medium;
information demodulating means for demodulating the information read by said information reading means and outputting the demodulated information including demodulated picture information and demodulated character information;
picture information reproducing means for reproducing and displaying said demodulated picture information on a display unit;
character information reproducing means for reproducing and displaying characters or figures represented by said demodulated character information in one or more colors on the display unit; and
control means for controlling said character information reproducing means, independently from said picture information reproducing means, to vary the display speed of said character information, to vary the shape of the displayed characters and figures, and to vary the colors used to display such characters and figures.

7. An apparatus according to claim 6, further comprising:
accoustoelectric transducer means for transducing voice sound sung in relation to accompaniment information included in said digital audio information into electric voice information; and
information mixing means for mixing said accompaniment information with said electric voice information.

8. An apparatus according to claim 7, wherein said character information is displayed on said display unit in time with the display speed at which said accompaniment information is reproduced.

9. An apparatus according to claim 7, wherein said character information comprises information which represents a timing at which the song is to be started.

10. An apparatus according to claim 7, wherein said character information comprises information which represents a guidance remark in relation to an expression of singing.

11. An apparatus according to claim 7, wherein a language of said character information is freely selectible from a plurality of languages.

12. An apparatus according to claim 6, further comprising;
command input means for inputting commands to vary the display speed of said character information, to vary the shape of the displayed characters and figures, and to vary the colors used to display the characters and figures, wherein said control means controls said character information reproducing means in accordance with the command input by said command input means.

* * * * *